3,291,619
CERAMIC PRODUCTS AND PROCESS OF
MAKING SAME
Daniel W. Luks, Frenchtown, N.J., assignor to Frenchtown Porcelain Company, Trenton, N.J., a corporation of New Jersey
No Drawing. Filed Aug. 6, 1963, Ser. No. 300,186
2 Claims. (Cl. 106—46)

This invention relates to a new ceramic body and in particular to a ceramic body characterized by a black or near-black color, an increased emissivity, low surface resistance, high physical strength and good dielectric properties.

In the manufacture of electrical equipment, for example in the bases for various types of electron tubes, it is desirable to use a ceramic which combines good dielectric properties with black color and high emissivity.

In some applications, e.g., in the envelopes of certain types of super power electron tubes, it is also desirable that the material used have a relatively low surface resistivity to prevent build up of a static charge on the tube envelope.

In my Patent No. 2,290,107 I have described ceramic bodies based on the system $Al_2O_3$—$SiO_2$—MnO. These bodies have high mechanical strength and excellent dielectric properties. However, these are generally reddish-brown in color and have an emissivity of about 0.4. (For comparison it may be noted that a white alumina body has an emissivity of about 0.2.)

I have discovered that by modifying the compositions disclosed in my prior patent based on the system $Al_2O_3 \cdot SiO_2 \cdot MnO$ to incorporate a relatively small proportion of $TiO_2$, I can obtain fired ceramic bodies which are black or near-black in color with an emissivity of about 0.6–0.7. Moreover these bodies can be made to have a surface resistance much below that of the prior bodies, whilst maintaining good dielectric properties.

The invention, therefore, comprises a fired ceramic body comprising, by weight, between about 68.5 and about 98.5% $Al_2O_3$, between about 0.5 and about 30% $SiO_2$, between about 0.5 and about 30% MnO and between about 0.5 and about 8% $TiO_2$. Preferably, the body will contain, by weight, between about 67 and about 96% $Al_2O_3$, between about 1 and about 30% $SiO_2$, between about 1 and about 30% MnO and between about 2 and about 8% $TiO_2$.

Bodies in accordance with the invention can be made by conventional techniques. According to conventional practice the compositions of the bodies have been stated in terms of oxide analyses, and they may be prepared by mixing and firing the oxides as such. However, it will be understood that the raw batch, before firing, can also be made up from various commercially available minerals in proportions calculated to give the desired oxide analysis in the final product. Thus, for example, the alumina may be added as $Al_2O_3$ or in part as clay. The silica may be added as $SiO_2$ or as clay. The MnO may be added as such, as $MnO_2$ or as any of various minerals containing manganese in a suitable proportion. Titania can be added in the form of minerals such as rutile or anatase.

In making the bodies according to the invention, the ingredients are reduced to finely divided form, say 0.003" to 0.002", and thoroughly mixed. To aid in shaping the bodies, the essential ingredients may be mixed with water or with an organic material which will be evaporated or destroyed in firing. Mixtures of cellulose acetate in acetone are an example of such organic material. It is often desirable to use a clay such as a bentonite clay as the source of silica and/or alumina because it aids in shaping the desired body.

The composition may be shaped by extrusion, molding, pressing or any other conventional means and then fired. Firing may be carried out in an oxidizing, inert or reducing atmosphere. However, it has been found that the use of a reducing atmosphere substantially decreases the surface resistivity of the final product, and if an exceptionally low surface resistivity is required a reducing atmosphere, e.g., $H_2$ or a mixture of hydrogen with $N_2$ may be employed.

Firing is normally carried out in the range of 2400 to 2800° F., depending on the particular composition. Normally the bodies will be brought to temperature at a rate not exceeding say 40° C./min. maintained at maximum temperature for say 60 min. to 120 min. and cooled at a maximum rate of say 30° C./min.

The invention will be further described with reference to the following specific examples which are given for purposes of illustration only and are not to be taken as in any way restricting the invention beyond the scope of the appended claims.

In all the examples proportions are by weight and temperatures in degrees Fahrenheit unless otherwise stated.

*Example I*

A raw batch was made consisting of 67.2 parts of alumina ($Al_2O_3$), 24.0 parts of silica ($SiO_2$), 5.9 parts of manganese dioxide ($MnO_2$) and 4.0 parts of titania (anatase $TiO_2$). This was ground to a fine powder and mixed with sufficient water to enable it to be shaped. It was then molded into a cylindrical test body and fired at about 2700° F. in air. Firing was conducted by heating to temperature over a period of about 17½ hours, soaking at temperature for 1 hour, and cooling over a period of 17½ hours. The oxide composition of the fired body was, percent by weight

| | |
|---|---:|
| $Al_2O_3$ | 67.2 |
| $SiO_2$ | 24.0 |
| MnO | 4.8 |
| $TiO_2$ | 4.0 |
| | 100.0 |

The body was dark brown in color.

*Example II*

A raw batch was made up from 67.2 parts of alumina, 14.4 parts of silica, 17.6 parts of $MnO_2$ and 4.0 parts of anatase. A cylindrical test body was molded, formed and fired as in Example I. It was black in color. It had a surface resistivity [1] of $1.95 \times 10^{13}$ ohms/cm.², a dielectric constant (at 1 mc.) of 7.7 and a loss factor (1 mc.) of 0.025.

The oxide analysis of the fired body was as follows (weight percent):

| | |
|---|---:|
| $Al_2O_3$ | 67.2 |
| $SiO_2$ | 14.4 |
| MnO | 14.4 |
| $TiO_2$ | 4.0 |
| | 100.0 |

---

[1] Surface resistivity was measured by painting two strips of silver paste (Du Pont 4929) on the surface of the ceramic to be tested, the ends of the strips being exactly 1 cm. apart. A voltage was then impressed across the two silver strips and the resulting current measured on with a Keithley Electrometer and decade shunt. Surface resistivity was then calculated as $R_s = V/I$ where V was the potential drop across the 1 cm. ceramic space in volts and I was the current through the circuit in amperes. The value of V in the determination made herein was about 137.5 V.

Example III

A raw batch was made up from 76.8 parts of alumina, 14.4 parts of silica, 5.9 parts of manganese dioxide and 4.0 parts of silica. A cylindrical test body was formed and fired as in Example I. It had a black color with a slight brown cast, a surface resistivity of 4.6 × 20" ohms/cm.$^2$, a dielectric constant of 7.5 (1 mc.) and a loss factor (1 mc.) of 0.096.

The oxide composition of this body was as follows:

| | |
|---|---|
| $Al_2O_3$ | 76.8 |
| $SiO_2$ | 14.4 |
| MnO | 4.8 |
| $TiO_2$ | 4.0 |
| | 100.0 |

Example IV

A body was made as in Examples I–III from a batch containing 67.2 parts $Al_2O_3$, 4.8 parts $SiO_2$, 29.4 parts $MnO_2$ and 4.0 parts $TiO_2$. A black body having the following oxide composition was obtained:

| | |
|---|---|
| $Al_2O_3$ | 67.2 |
| $SiO_2$ | 4.8 |
| MnO | 24.0 |
| $TiO_2$ | 4.0 |
| | 100.0 |

Example V

A body was made following the procedure of Examples I–IV, using a batch composed of 76.8 parts of $Al_2O_3$, 4.8 parts of $SiO_2$, 17.6 parts $MnO_2$ and 4.0 parts of $TiO_2$. A black body having a surface resistivity of 1.3 × 10$^{12}$ ohms/cm.$^2$ was obtained. The oxide composition was as follows (weight percent):

| | |
|---|---|
| $Al_2O_3$ | 76.8 |
| $SiO_2$ | 4.8 |
| MnO | 14.4 |
| $TiO_2$ | 4.0 |
| | 100.0 |

Example VI

A body was made as in Examples I–V from a batch consisting of 86.4 parts alumina, 4.8 parts silica, 5.9 parts $MnO_2$ and 4.0 parts anatase. It was black with a slight brown cast. It had a surface resistivity of 2.7 × 10$^{13}$ ohms/cm.$^2$, a dielectric constant (1 mc.) of 9.0 and a loss factor (1 mc.) of 0.025.

Example VII

A body was made up as in Example I using a batch consisting of 90.5 parts of alumina, 5.0 parts of bentonite,[2] 4.0 parts of $MnO_2$ and 0.5 part of anatase. The body was dark brown in color, had a specific gravity of 3.7148, a modulus of rupture of 46,800 p.s.i., a dielectric power factor of 0.000719, a loss factor (1 mc.) of 0.00705, and a surface resistivity of 1.38 × 10$^{13}$.

Example VIII

A body was made up using a raw batch consisting of

[2] The bentonite had the following composition (Wt. percent):

| | |
|---|---|
| $SiO_2$ | 60.15 |
| $Al_2O_3$ | 19.88 |
| $Fe_2O_3$ | 2.97 |
| FeO | 0.54 |
| $TiO_2$ | 0.08 |
| CaO | 0.67 |
| $Na_2O$ | 2.60 |
| MgO | 2.20 |
| $K_2O$ | 0.40 |
| $P_2O_5$ | 0.01 |
| $H_2O$ | 4.92 |
| Ignition loss | 5.58 |
| | 100.00 |

98% of a commercially available high alumina ceramic having the following composition:

| | |
|---|---|
| $Al_2O_3$ | 93.61 |
| $SiO_2$ | 2.74 |
| MnO | 2.82 |
| $B_2O_3$ | 0.001 |
| NiO | <0.001 |
| $Fe_2O_3$ | 0.026 |
| $TiO_2$ | 0.07 |
| CaO | 0.20 |
| MgO | 0.50 | and 2% $TiO_2$. The ceramic and the $TiO_2$ were milled to a particle size <0.003", and sufficient water was added to enable a test body to be formed. A cylindrical body was then molded and fired at 2700° F. for a period of 36 hours, there being a soak at maximum temperature of 1 hour. The atmosphere in this instance consisted of nitrogen and 25% $H_2$. The body had a gray-black color and a surface resistivity of 3.46 × 10$^{10}$ ohms.

Example IX

A body was prepared using the technique described in Example I from a raw batch consisting of alumina 87.4%, bentonite 4.8%, $MnO_2$ 3.8% and anatase 4.0%. After firing, the body was black in color and had a loss factor of 0.00784 and a surface resistivity of 5.52 × 10$^{12}$ ohms.

Example X

The procedure of Example I was followed using a raw batch containing alumina 83.7%, bentonite 4.6%, $MnO_2$ 3.7% and anatase 8.0%. The body was black in color and had a loss factor of 0.01058 and a surface resistivity of 6.9 × 10$^{12}$ ohms.

From a consideration of the foregoing, it will been seen that the present invention provides bodies which combine high mechanical strengths (modulus of rupture on the order of 50,000 p.s.i.) with good dielectric properties, low surface resistivity and black color. The latter is particularly striking and surprising since bodies having the same compositions, less $TiO_2$, are brown or reddish brown and $TiO_2$ is itself white. Moreover, this color effect appears limited to a narrow range of compositions since above 8% $TiO_2$ the black color begins to revert to brown.

What is claimed is:

1. A fired ceramic body consisting essentially of, by weight:

| | Percent |
|---|---|
| $Al_2O_3$ | 68.5 to 98.5 |
| $SiO_2$ | 0.5 to 30.0 |
| MnO | 0.5 to 30.5 |
| $TiO_2$ | 0.5 to 8.0 | having a surface resisivity of between about 3.46 × 10$^{10}$ and about 2.7 × 10$^{13}$ ohms and a loss factor at 1 megacycle of between about 0.096 and about 0.007.

2. A fired ceramic body consisting essentially of, by weight:

| | Percent |
|---|---|
| $Al_2O_3$ | 67 to 96 |
| $SiO_2$ | 1 to 30 |
| MnO | 1 to 30 |
| $TiO_2$ | 2 to 8 |

References Cited by the Examiner
UNITED STATES PATENTS

| | | | |
|---|---|---|---|
| 2,290,107 | 7/1942 | Luks | 106—57 |
| 2,502,198 | 3/1950 | Benner et al. | 106—65 |
| 2,962,452 | 11/1960 | Counts et al. | 252—520 |
| 3,036,018 | 5/1962 | Peras | 252—520 |

TOBIAS E. LEVOW, *Primary Examiner.*

HELEN M. McCARTHY, *Examiner.*

UNITED STATES PATENT OFFICE
CERTIFICATE OF CORRECTION

Patent No. 3,291,619                        December 13, 1966

Daniel W. Luks

It is certified that error appears in the above identified patent and that said Letters Patent are hereby corrected as shown below:

Column 3, line 7, "4.6×20" should read -- 4.6×10 --.
Column 4, after line 64, insert -- having a surface resistivity of between about $3.46 \times 10^{10}$ and about $2.7 \times 10^{13}$ ohms and a loss factor at 1 megacycle of between about 0.096 and about 0.007. --.

Signed and sealed this 2nd day of September 1969.

(SEAL)
Attest:

Edward M. Fletcher, Jr.                      WILLIAM E. SCHUYLER, JR.
Attesting Officer                              Commissioner of Patents